United States Patent [19]

Peet

[11] 4,187,950
[45] Feb. 12, 1980

[54] GAS CAN TRANSPORTER

[76] Inventor: Gale P. Peet, 6960 Yarmouth Ave., Reseda, Calif. 91335

[21] Appl. No.: 810,428

[22] Filed: Jun. 27, 1977

[51] Int. Cl.² .................... B65G 65/24; F17C 13/08; B65G 65/00
[52] U.S. Cl. .................................. 414/421; 222/166; 280/651
[58] Field of Search ................. 214/300-302, 214/312-314, 620, 700, 701 R; 222/166, 608-610; 280/651-654; 239/146-149, 286

[56] References Cited

U.S. PATENT DOCUMENTS

| | | | |
|---|---|---|---|
| 369,912 | 9/1887 | Brown | 222/608 |
| 568,781 | 10/1896 | Mahon | 222/166 |
| 765,374 | 7/1904 | Bletzinger | 222/166 |
| 1,220,640 | 3/1917 | Kelly | 214/314 |
| 1,727,063 | 9/1929 | Hultgren | 222/166 |
| 1,937,668 | 12/1933 | Pine | 214/312 |
| 2,324,747 | 7/1943 | Weissert | 222/166 |
| 2,592,085 | 4/1952 | Van Doorne | 214/302 |
| 3,270,901 | 9/1966 | Ord | 214/314 |
| 3,294,266 | 12/1966 | Snow | 214/314 |

FOREIGN PATENT DOCUMENTS 101756 8/1937 United Kingdom ............ 222/166

Primary Examiner—Francis S. Husar
Assistant Examiner—R. B. Johnson
Attorney, Agent, or Firm—Roger A. Marrs

[57] ABSTRACT

A transporter for liquid containers is disclosed for carrying gas cans from one place to another which includes a wheeled frame supporting the gas cans by pivotal attachments to a plurality of frontal bars outwardly projecting from a vertical brace. The frontal bars define a pair of storage areas or compartments substantially occupied by the gas cans. The vertical brace includes an axle for supporting a pair of main wheels while pivotal front wheels are provided on the cantilevered ends of the frontal bars for increased maneuverability. Each of the gas cans are pivotally carried on the pivotal attachments by supporting straps which are secured to the can by a suitable removable fastener.

1 Claim, 5 Drawing Figures

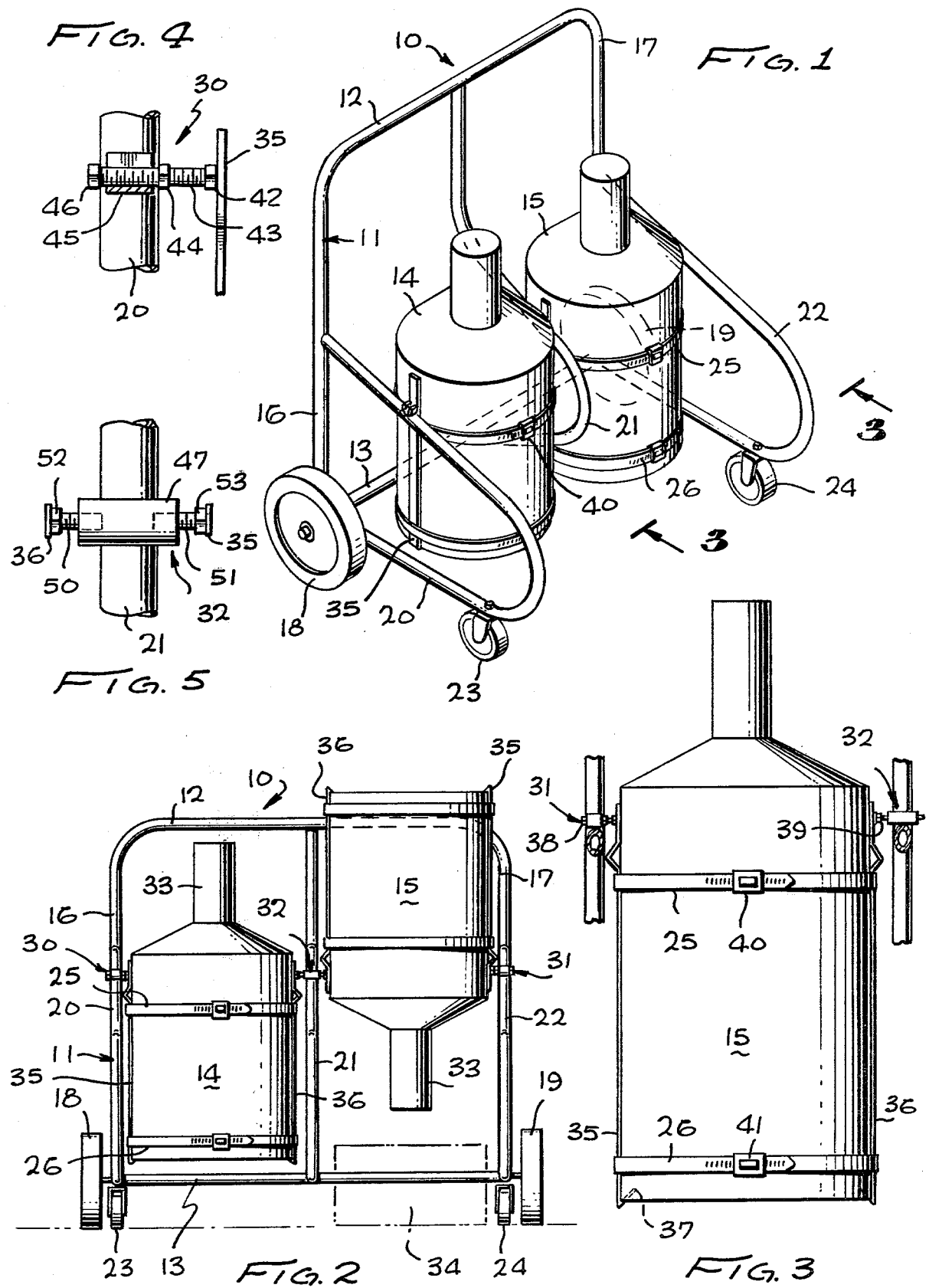

GAS CAN TRANSPORTER

BACKGROUND OF THE INVENTION

1. Field of the Invention

The present invention relates to liquid container carts or transporting units and more particularly to a novel sheeled arrangement for transporting gas cans from one place to another in a convenient and maneuverable manner.

2. Brief Description of the Prior Art

It has been the common practice in the operation of gas and service stations to periodically test the calibration of the gasoline dispensing pumps normally situated on a gasoline dispensing island at the service station. After a predetermined sampling of the gasoline has been collected in a test can or container, the can or container is then transported to an emptying station or tank where the contents of the can are dispensed into bulk storage.

In the past, a variety of carts and dollys have been employed for transporting the test containers or cans from the dispensing island to the emptying station. Most of these prior arrangements comprise a two-wheeled dolly having a lower lip which supports the weight of the can or container and includes a frame against which the can or container rests as the operator balances the load on the pair of wheels. Also, a flatbed cart having castered wheels has been employed with undesirable results since the cans must be lifted onto the flatbed and removed therefrom which is difficult due to the weight of the containers. For test and calibration purposes, generally five gallons of gas are dispensed from the pump and placed in the container. Not only is the container heavy, but bulky and awkward to handle.

Therefore, a long standing need has existed to provide a novel transporter for conveniently moving five gallon gas cans from one place to another with increased mobility and ease in emptying the contents back into bulk storage.

SUMMARY OF THE INVENTION

Accordingly, the above problems and difficulties are obviated by the present invention which provides a novel transporter for gas cans comprising a wheeled frame having vertical brace portion including a handlebar and an axle for supporting a pair of wheels. The wheeled frame further inclues a plurality of frontal bars outwardly projecting in a cantilevered manner from the vertical brace member and wherein adjacent ones of the frontal bars define a storage area or space therebetween. The storage area is intended to be occupied by one of the gas containers or cans and the can is pivotally carried in the storage area by means of pivotal attachments cooperating to support each of the cans between adjacent ones of the frontal bars. Strap means are provided on each of the cans for securing the can to the pivotal attachments.

Therefore, it is among the primary objects of the present invention to provide a novel transporter or cart for liquid carrying containers which will pivotally mount thhe containers in a manner so that the containers may be readily filled and emptied while being transported on the cart.

Another object of the present invention is to provide a novel transporter for gas cans wherein the cans may be readily carried from one place to another and pivotally mounted on frontal bars of the wheeled frame whereby the gas containers may be easily filled and readily emptied therefrom.

Still a further object of the present invention is to provide a novel and inexpensive transporting means for carrying five gallon gas cans from one place to another.

A further object of the present invention is to provide a simplified cart apparatus for moving five gallon gas cans from a gasoline dispensing island to a remote collection station for returning the gasoline to bulk storage wherein a plurality of cans may be so transported without the operator having to lift or individually maneuver each of the gas cans.

BRIEF DESCRIPTION OF THE DRAWINGS

The features of the present invention which are believed to be novel are set forth with particularity in the appended claims. The present invention, both as to its organization and manner of operation, together with further objects and advantages thereof may best be understood by reference to the following description, taken in connection with the accompanying drawings in which:

FIG. 1 is a front perspective view of the novel gas can transporter of the present invention;

FIG. 2 is a front elevational view of the novel transporter shown in FIG. 1 illustrating the pivotal action of one of the cans being transported;

FIG. 3 is an enlarged cross-sectional view of a gas can occupying a storage area defined between adjacent frontal bars as taken in the direction of arrows 3—3 of FIG. 1;

FIG. 4 is an enlarged fragmentary sectional view of the pivotal attachment carried by a frontal bar for supporting one side of a gas can; and FIG. 5 is an elevational view of a typical center or mid-position pivotal attachment used to support adjacent gas cans.

DESCRIPTION OF THE PREFERRED EMBODIMENT

Referring to FIG. 1, the novel gas can transporter of the present invention is illustrated in the general direction of arrow 10 which includes a wheeled frame comprising a vertical brace member 11 having a pair of cross bars 12 and 13. Cross bar 12 constitutes a handle by which the operator may push or pull the wheeled transporter from one place to another carrying a plurality of gas cans such as is identified by numerals 14 and 15. The member 13 constitutes an axle carried on the ends of side bars 16 and 17 which connect at their opposite ends with the ends of handlebar 12. The ends of the axle 13 rollably support wheels 18 and 19.

Outwardly projecting from the wheeled frame 11, there is provided a plurality of frontal bars identified by numerals 20, 21 and 22 respectively. The frontal bars are substantially U-shaped in side elevational view and are attached at their respective ends to the wheeled frame so as to be cantilevered forward of the frame whereby at least a pair of storage spaces or areas are defined between adjacent frontal bars. The storage areas are occupied by the gas cans 14 and 15 respectively. It is to be noted that the central frontal bar 21 is of shorter length then the side frontal bars 20 and 22 whereby the terminating end of the frontal bar 21 does not exceed the furthermost perimeter of the cans occupying the storage areas. This arrangement permits ready mobility and maneuverability of the transporter over obstacles installed on the ground over which the transporter is intended to travel.

Maneuverability of the transporter is further increased by the provision of pivoted or castered wheels 23 and 24 which downwardly depend from the outward and terminating end of the side frontal bars 20 and 22 respectively. The pivotal wheels 23 and 24 are in alignment with the wheels 18 and 19 respectively so that the transporter is fully supported by wheels and balanced by the four wheels so that the entire load of the cart is carried thereon. No balancing is thereby required by the operator during transporting of the gas cans on the transporter or cart.

Each of the respective gas cans are removably carried on the pivotal attachments carried by the frontal bars by means of straps arranged to support the load of the container. The strap means is illustrated in general by numerals 25 and 26 associated with can 15 and which will be described in greater detail with respect to FIG. 3.

Referring now in detail to FIG. 2, it can be seen that the cans 14 and 15 are carried on pivoted attachments so that they may be rotated from an upright position to an inverted position as is illustrated by can 15. The end attachment means for pivotally supporting the cans are identified by numerals 30 and 31 which are identical in construction and will be described in detail with respect to FIG. 3. The central pivotal attachment is identified by numeral 32 and will be described in detail with respect to FIG. 4. The pivotal attachments balance each of the gas cans on the adjacent frontal bars occupying the storage space defined the frontal bars. The cans are downwardly depending from the end attachments and the central attachment by the strap means. When the can is in the position as shown in FIG. 2, gasoline may be dispensed through an inlet nozzle 33 where the gasoline is stored internally of the main body of the can. The cart is maneuvered over the ground as desired by the operator and when it is desired to empty the contents of the can, the can is inverted as shown by the position of can 15 so that the liquid contents of the can may be dispensed into a collection container or hopper identified by numeral 34. Due to the shortened length of the central frontal bar 21, the cart may be readily positioned over the hopper 34 so that either of the cans 14 or 15 may be readily emptied therein.

Referring now in detail to FIG. 3, the strap means for removably securing each of the cans to adjacent frontal bars is more clearly illustrated. For example, with respect to container 15, circumferential bands 25 and 26 are trained not only around the body of the can 15 but about vertical side straps 35 and 36 respectively. Each of the straps 35 and 36 include angular projections, such as projection 37 carried on strap 36, which support an edge lip formed on the bottom of the can 15. The opposite end of the strap terminates in a pivotal connection by means of an elongated pivot 38 associated with strap 35 and a pivot 39 associated with strap 36. Each of the bands 25 and 26 further includes a releasable clamp-type buckle 40 and 41 respectively for detachably connecting the strap means to the can for pivotally supporting the can on the frontal bars.

Referring now in detail to FIG. 4, the end pivot such as pivot 30 is illustrated wherein the end of strap 35 is welded to a nut 42 that is in threadable engagement with a threaded shank 43. A nut 44 is included on the threaded shank in order to keep the bucket or can in pivotal alignment with a supporting sleeve 45 which is open at the top. The length of a portion of the threaded shank 43 lies on the sleeve 45 and the shank terminates in a head 46. Since the head 46 and the nut 44 are of increased diameter as compared to the threaded shank, the threaded shank is maintained on the sleeve 45 and in position.

In FIG. 5, the center bucket or can strap pivot arrangement is illustrated wherein a pipe sleeve 47 is secured to the frontal bar 21 and studs 50 and 51 outwardly project from the opposite sides thereof. The studs terminate in nuts 52 and 53 which are welded to the respective straps 35 and 36 associated with each of the strap means for supporting the adjacent buckets or cans. Since the pivot 32 is in the center separating the buckets or cans, nut 52 is carried by the strap 36 associated with can 14 while the strap 35 associated with can 15 is carried on the nut 53.

Therefore, it can be seen that the cart or transporter apparatus of the present invention provides a novel means for transporting at least a pair of buckets or cans from one place to another in a convenient and readily maneuverable manner. The buckets or cans are removably carried on the main frame by pivotal means which include removable straps securing the buckets or cans thereon. The cans may be pivoted individually so as to dispense or empty their contents into a receiving receptable or hopper. The hopper may be located below or above ground level and a single operator may readily move the transporter about with fully loaded cans and the sole operator may also dispense the contents of each of the cans into the receptacles.

While a particular embodiment of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A transporter for liquid containers comprising:
a pair of liquid containers;
a wheeled frame having a vertical brace portion and a frontal portion extending outwardly from said brace portion;
said frontal portion having a plurality of bars defining storage areas between adjacent ones of said bars intended to be occupied by a liquid container;
pivot means secured to said frontal bars;
strap means detachably secured to each of said liquid containers for rotatably mounting said liquid containers onto said bars via said pivot means;
said wheeled frame includes a pair of wheels carried on said vertical brace portion and a pair of castered wheels carried on selected ones of said frontal bars;
said strap means includes a pair of vertically disposed straps associated with each container and a pair of removable bands trained about said straps and said associated container;
said pivot means includes laterally projecting pivots carried from each of said vertical straps rotatably engageable with a respective sleeve secured to each of said frontal bars;
at least three frontal bars are provided and wherein the center frontal bar is of shorter length than the adjacent side front bars; and
said pivot means permit said liquid containers to rotate in a fore and aft orientation with respect to said wheeled frame.

* * * * *